(12) United States Patent
Gabrys et al.

(10) Patent No.: US 12,143,057 B2
(45) Date of Patent: Nov. 12, 2024

(54) SWITCHING FOR SIX-STEP MOTOR DRIVES

(71) Applicants: Christopher W. Gabrys, Reno, NV (US); Timothy S Rodgers, Bainbridge Island, WA (US)

(72) Inventors: Christopher W. Gabrys, Reno, NV (US); Timothy S Rodgers, Bainbridge Island, WA (US)

(73) Assignee: Revolution Electric Motor Company, Reno, NV (US)

( * ) Notice: Subject to any disclaimer, the term of this patent is extended or adjusted under 35 U.S.C. 154(b) by 99 days.

(21) Appl. No.: 17/965,713

(22) Filed: Oct. 13, 2022

(65) Prior Publication Data

US 2024/0128904 A1  Apr. 18, 2024

(51) Int. Cl.
*H02K 11/33* (2016.01)
*H02P 8/12* (2006.01)
*H02P 27/08* (2006.01)

(52) U.S. Cl.
CPC ............. *H02P 8/12* (2013.01); *H02P 27/08* (2013.01)

(58) Field of Classification Search
CPC ................................. H02P 8/12; H02P 27/08
See application file for complete search history.

(56) References Cited

U.S. PATENT DOCUMENTS

| | | | | |
|---|---|---|---|---|
| 4,488,101 A * | 12/1984 | Studtmann | ........... | H02P 25/03 |
| | | | | 318/811 |
| 6,236,179 B1 * | 5/2001 | Lawler | ........... | H02P 6/085 |
| | | | | 318/599 |
| 2020/0358380 A1 * | 11/2020 | Gabrys | ........... | H02P 6/28 |

OTHER PUBLICATIONS

Kim, Taeyeon & Kim, Chungil & Lyou, Joon. (2011). A new sensorless drive scheme for a BLDC motor based on the terminal voltage difference. IECON Proceedings (Industrial Electronics Conference). 10.1109/IECON.2011.6119564.

P. Damodharan and K. Vasudevan, "Sensorless Brushless DC Motor Drive Based on the Zero-Crossing Detection of Back Electromotive Force (EMF) From the Line Voltage Difference," in IEEE Transactions on Energy Conversion, vol. 25, No. 3, pp. 661-668, Sep. 2010, doi: 10.1109/TEC.2010.2041781.

C. Chen and M. Cheng, "A New Sensorless Commutation Drive for Brushless DC Motors and Alternators," 2006 IEEE International Symposium on Industrial Electronics, 2006, pp. 2116-2121, doi: 10.1109/ISIE.2006.295900.

(Continued)

*Primary Examiner* — Muhammad S Islam

(57) ABSTRACT

A switching method for six-step motor drive with an output inverter that provides commutation switching of power to the phase windings of a driven motor includes regulating the current to the output inverter and to the motor by a variable bus.

switching six transistors of a three phase H-bridge and six associated freewheeling diodes of the output inverter by a pair of two transistors to commutate power to the phase windings conducting during conduction steps, and at each commutation step one off-going transistor is switched off and one on-going transistor is switched on the switching method further comprising monitoring of the back emf on two legs of the phase windings of the motor for determining commutation timing, and commutating the output inverter through non-simultaneous switching of the off-going transistor with switching of the on-going transistor.

20 Claims, 13 Drawing Sheets

(56) References Cited

OTHER PUBLICATIONS

J. Fang, W. Li and H. Li, "Self-Compensation of the Commutation Angle Based on DC-Link Current for High-Speed Brushless DC Motors With Low Inductance," in IEEE Transactions on Power Electronics, vol. 29, No. 1, pp. 428-439, Jan. 2014, doi: 10.1109/TPEL.2013.2254499.

D. Lee and W. Lee, "Analysis of Relationship Between Abnormal Current and Position Detection Error in Sensorless Controller for Interior Permanent-Magnet Brushless DC Motors," in IEEE Transactions on Magnetics, vol. 44, No. 8, pp. 2074-2081, Aug. 2008, doi: 10.1109/TMAG.2008.923203.

Feng, J., Liu, K. and Wang, Q. (2018), Scheme based on buck-converter with three-phase H-bridge combinations for high-speed BLDC motors in aerospace applications. IET Electric Power Applications, 12: 405-414. https://doi.org/10.1049/iet-epa.2017.0615.

Liu, Gang & Chen, Xi & Zheng, Shiqiang & Cui, Peiling. (2020). Commutation Error Rapid Compensation for Brushless DC Motor Based on DC-link Current Phase Extraction Method. IET Electric Power Applications. 14. 10.1049/iet-epa.2019.0660.

H. Jin, G. Liu, H. Li, B. Chen and H. Zhang, "A Fast Commutation Error Correction Method for Sensorless BLDC Motor Considering Rapidly Varying Rotor Speed," in IEEE Transactions on Industrial Electronics, vol. 69, No. 4, pp. 3938-3947, Apr. 2022, doi: 10.1109/TIE.2021.3070493.

X. Zhou, X. Chen, M. Lu and F. Zeng, "Rapid Self-Compensation Method of Commutation Phase Error for Low-Inductance BLDC Motor," in IEEE Transactions on Industrial Informatics, vol. 13, No. 4, pp. 1833-1842, Aug. 2017, doi: 10.1109/TII.2017.2653812.

H. Li, S. Zheng and H. Ren, "Self-Correction of Commutation Point for High-Speed Sensorless BLDC Motor With Low Inductance and Nonideal Back EMF," in IEEE Transactions on Power Electronics.

* cited by examiner

Six Step Inverter Switching Table

Table 500:

| Intervals (degree) | Transistor "on" | Polarities A B C | Consequences of Late Turn Off Commutations |
|---|---|---|---|
| 30 - 90 | T1, T4 | + - 0 | If T4 is turned off late after $V_{BC} = 0$ @ 90°, then $V_{BC} = +$, and T4 combined with D6 shorts $V_{BC}$ |
| 90 - 150 | T1, T6 | + 0 - | If T1 is turned off late after $V_{AB} = 0$ @ 150°, then $V_{AB} = -$, and T1 combined with D3 shorts $V_{AB}$ |
| 150 - 210 | T3, T6 | 0 + - | If T6 is turned off late after $V_{AC} = 0$ @ 210°, then $V_{AC} = -$, and T6 combined with D2 shorts $V_{AC}$ |
| 210 - 270 | T3, T2 | - + 0 | If T3 is turned off late after $V_{BC} = 0$ @ 270°, then $V_{BC} = -$, and T3 combined with D5 shorts $V_{BC}$ |
| 270 - 330 | T5, T2 | - 0 + | If T2 is turned off late after $V_{AB} = 0$ @ 330°, then $V_{AB} = +$, and T2 combined with D4 shorts $V_{AB}$ |
| 330 - 390 | T5, T4 | 0 - + | If T5 is turned off late after $V_{AC} = 0$ @ 390°, then $V_{AC} = +$, and T5 combined with D1 shorts $V_{AC}$ |

Table 600:

| Intervals (degree) | Transistor "on" | Polarities A B C | Consequences of Early Turn On Commutations |
|---|---|---|---|
| 30 - 90 | T1, T4 | + - 0 | If T6 is turned on early before $V_{BC} = 0$ @ 90°, then $V_{BC} = -$, and T6 combined with D4 shorts $V_{BC}$ |
| 90 - 150 | T1, T6 | + 0 - | If T3 is turned on early before $V_{AB} = 0$ @ 150°, then $V_{AB} = +$, and T3 combined with D1 shorts $V_{AB}$ |
| 150 - 210 | T3, T6 | 0 + - | If T2 is turned on early before $V_{AC} = 0$ @ 210°, then $V_{AC} = +$, and T2 combined with D6 shorts $V_{AC}$ |
| 210 - 270 | T3, T2 | - + 0 | If T5 is turned on early before $V_{BC} = 0$ @ 270°, then $V_{BC} = +$, and T5 combined with D3 shorts $V_{BC}$ |
| 270 - 330 | T5, T2 | - 0 + | If T4 is turned on early before $V_{AB} = 0$ @ 330°, then $V_{AB} = -$, and T4 combined with D2 shorts $V_{AB}$ |
| 330 - 390 | T5, T4 | 0 - + | If T1 is turned on early before $V_{AC} = 0$ @ 390°, then $V_{AC} = -$, and T1 combined with D5 shorts $V_{AC}$ |

Fig. 11

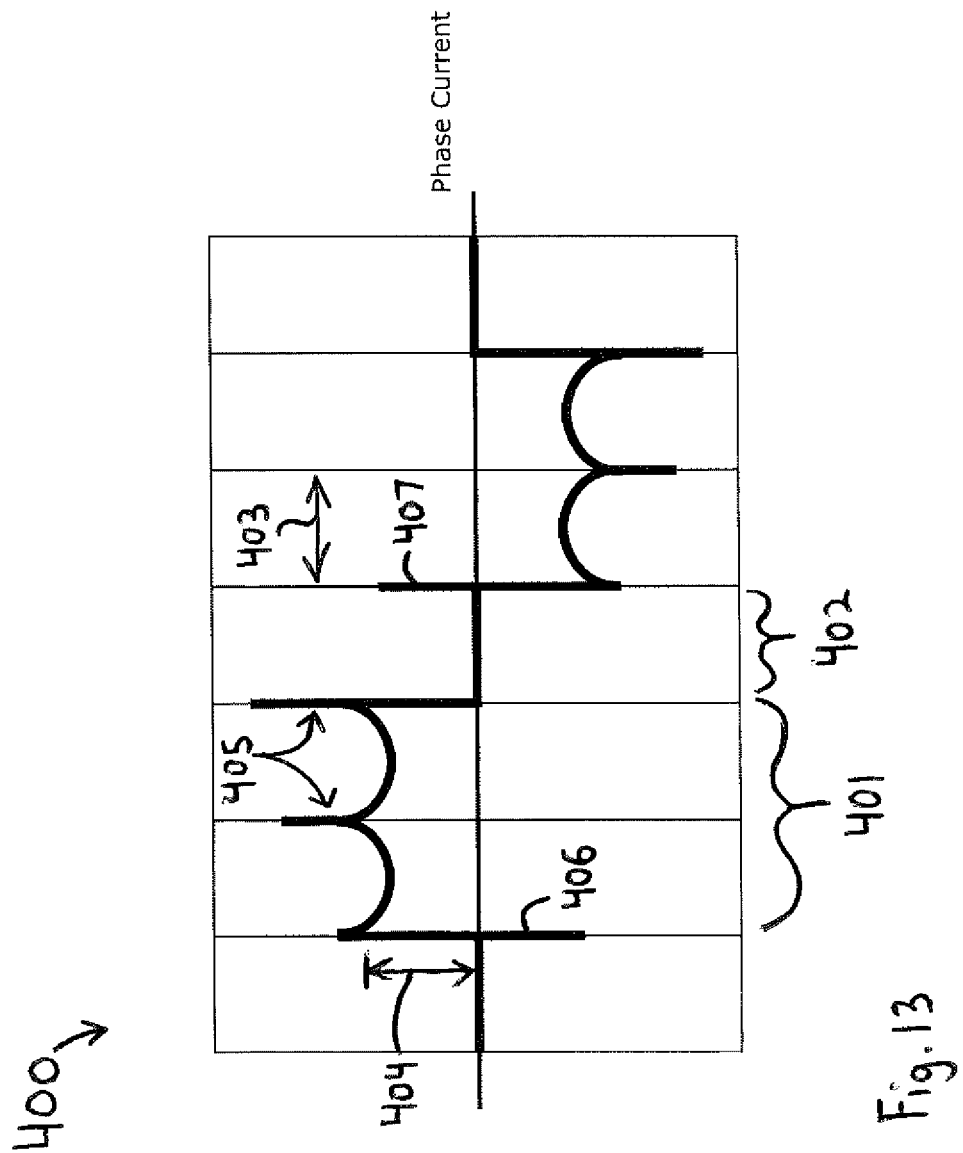

SWITCHING FOR SIX-STEP MOTOR DRIVES

This invention pertains to six-step motor drives, and more particularly to an improved switching method that reduces the development of phase current spikes and surges during commutations of the output inverter powered from a variable supply bus. The new switching method increases the operating efficiency of both the motor drive and the motor being powered, while it also simultaneously reduces generated noise and stresses on the motor drive's semiconductor switches and the motor's winding insulation.

BACKGROUND OF THE INVENTION

There is much effort presently being undertaken to develop new electric motors and generators that can provide higher efficiency power conversion between electrical and rotary mechanical energy. Simultaneously, efforts are also focused on reducing the amount of materials utilized and reducing manufacturing costs, while attaining higher efficiency. New electric machines that can achieve higher power conversion efficiency, but are more costly than current traditional machines, are less likely to be well-accepted into the marketplace if at all. The industry-wide goal is to provide higher efficiency and also have lower costs.

Development of new electric motors for achieving higher efficiency is mostly focused on use of synchronous topologies, which require the use of a variable frequency inverter, or motor drive, to operate. Use of electronic inverters is also becoming commonplace as a means to increase operational efficiency with all motors by varying the rotational speed, which supports the emergence of new synchronous motors. One type of synchronous motors that have the potential to provide both the highest efficiency and the lightest motor weight are air core motors, depending on the design and manufacturing used. Air core motors differ from conventional slotted motors by their windings being located directly within the magnetic airgap, instead of being wound around ferromagnetic stator poles. This construction without ferromagnetic stator poles can greatly reduce magnetic induced stator losses from eddy currents and hysteresis. However, air core motor construction also inadvertently results in a dramatically reduced armature winding inductance. To date, the low inductance windings of air core motors have made them more challenging for motor drives to properly drive them. Additionally, for the highest performance air core motor versions, they utilize a high pole count to reduce motor weight. This increased pole count requires higher than typical motor drive fundamental frequency capability, further making the task of driving them yet more difficult.

One promising type of drive for use with both air core motors and conventional slot wound synchronous motors is six-step drives. Unfortunately to date, such drives can create high current spikes, particularly when driving lower inductance motors with imprecise commutation timing. These current spikes can be as much as twice the normal operating current or higher, which reduces the efficiency of the motor drive and motor, while also reducing the life. Efficiency can be reduced through both increased resistive losses as well as production of negative torques.

Accordingly, a new switching method for six-step drives is needed to prevent generation of significant phase current spikes as well as surges during commutation. The new switching method should also be relatively low cost and easy to implement, while providing increased operating efficiencies of the motor drive and coupled motor with extended life.

SUMMARY OF THE INVENTION

The invention provides a switching method for six-step motor drives that can be used to reduce current surges during commutations while driving all types of motors, and also to eliminate back emf shorting current spikes that are created while driving low inductance air core motors with insufficiently precise commutation switching timing. Commutation switching accuracy for driving low inductance motors particularly with high fundamental frequencies without such current spikes has been difficult to achieve, as is known in the art.

The conventional method for commutation switching of six-step drives is to employ simultaneous switching off of one off-going transistor simultaneously with the switching on of one on-going transistor, in the output H-bridge inverter at each commutation step. This method provides the benefits of simplicity in both the control and circuit design. However, we have found that conventional six-step motor drive commutation switching can result in creation of undesirable losses that would preferably be eliminated. One loss is the potential for generating current surges when a freewheeling diode used to protect transistors from high voltage damage causes brief current flow in all three phases with a surge current in the phase winding remaining on during the commutation. A second loss is in use with low inductance motors. Air core motors can have winding inductances as much as three hundred times lower than conventional slot wound motors. As a result, they are many times more sensitive to commutation timing accuracy as will be explained. Slightly imprecise commutation accuracy from occurring at the desired back emf zero crossing when used with air core motors can cause generation of large current spikes at commutation due to unintended phase windings back emf shorting in the output inverter of the motor drive. Some inaccuracy can arise from electronics sensing, control as well as propagation, turn-on, turn-off and other delays. Both causes of current surges or current spikes lead to lower motor plus drive efficiency, either through increased resistive losses and/or the generation of instances of negative torque production.

The invention provides a switching method for six-step motor drives comprising a motor drive with an output inverter that provides commutation switching of power to the phase windings of a driven motor and is supplied by a variable bus that regulates the current to the output inverter and to the motor. The output inverter comprises a three phase H-bridge with six transistors and six associated freewheeling diodes, wherein the transistors are switched to commutate power to the phase windings by a pair of two transistors conducting during approximately 60 degree conduction steps and at each commutation step, one off-going transistor is switched off and one on-going transistor is switched on. The switching method further comprising monitoring of the back emf on two legs of the phase windings of the motor, and commutating the output inverter by non-simultaneous switching of the off-going transistor which is connected to one of the two legs being monitored, and switching of the on-going transistor, wherein the off-going transistor is switched off before differences of the back emf across the two legs reaches zero voltage and the on-going transistor is switched on after differences of the back emf across the two legs crosses zero voltage. Because transistors incur both turn-on and turn-off delays, which may also differ from each other, the switching of a transistor is herein defined to mean as instance at which the transistor is signaled or gate is activated to switch either on or off.

The output inverter providing the commutation switching may be supplied by a regulated voltage or by regulated current, yielding either a voltage source drive or a current source drive. However, we have found that it is preferable to utilize a current source inverter and particularly one with a fast current regulation response time to track variations in the motor back emf and waveform. Accordingly in a further embodiment, the voltage across the variable bus varies as regulated current is supplied to the output inverter.

There are several ways to implement the control for the commutation switching in accordance with the invention. In an additional embodiment, the switching off of the off-going transistor is controlled to switch at instances occurring when the differences of the back emf across the two legs has an absolute value of voltage that is slightly greater than zero. This provides an easy to implement control, however because the motor back emf varies with rotor speed, the commutation delay angle will not be constant. So, the absolute value of voltage that controls the switching of the off-going transistor is adjusted and varies as a portion of the present operating back emf. One way for implementing the commutation switching to switch off the off going transistor before zero back emf is to utilize a time calculation. In yet a further embodiment, the switching off of the off-going transistor is controlled to switch at instances occurring after an on-period of less than 120 degrees. In this case, the on-period and off-period of a particular transistor would therefore be purposely unequal, as contrary to the well-established convention known in the art.

The goal of the invention is to increase the efficiencies of the motor and electronic drive, while maintaining the reliable six-step commutation. The operating efficiency will be higher than conventionally switched six-step motor drives. In an additional embodiment, the switching reduces at least one of generated current spikes and generated current pulses, during commutation of the output inverter that would otherwise occur if employing simultaneous switching of the off-going transistor and switching of the on-going transistor.

The benefits of the switching method are most pronounced when the motor drive is used to drive motors having very low winding inductance. Low inductance windings allows current to ramp up very rapidly when a voltage is applied. This makes them very sensitive to imprecise commutation timing and to instantaneous back emf shorting through the drive via one transistor and forward biased freewheeling diode at non-zero back emfs. The switching method in accordance with the invention, can eliminate this problem and the large current spikes that it generates, regardless the back emf waveform shape. In a further embodiment, the driven motor comprises an air core motor with low windings inductance and the back emf being sinusoidal. Low inductance is defined as having phase winding inductance at least ten times lower than the same power and speed rated conventional slot wound motor. Typically, this results in phase winding inductances of less than 250 microhenries for most size motors for industrial applications. Likewise, sinusoidal back emf is defined as predominately sine wave compared as opposed to having a trapezoidal shape.

In an additional embodiment, the switching method for six-step motor drives comprises a motor drive with an output inverter that provides commutation switching of power to the phase windings of a driven motor and is supplied by a variable bus that regulates the current to the output inverter and to the motor. The output inverter comprises an H-bridge with three phases, six transistors and six associated freewheeling diodes, wherein the transistors are switched to commutate power to the phase windings by a pair of two transistors conducting during conduction steps, and at each commutation step one off-going transistor is switched off and one on-going transistor is switched on. The switching method further comprising monitoring of the back emf on two legs of the phase windings of the motor for determining commutation timing, and commutating the output inverter through non-simultaneous switching of the off-going transistor with switching of the on-going transistor. Non-simultaneous switching alone can be effective to reduce current surges at commutations for even conventional inductance slot wound motors. The delay implemented between switching on of the on-going transistor from switching off of the off-going transistor can reduce the increased current flowing through the non-commutated phase leg resulting from instantaneous currents flowing in all three legs with freewheeling diode conduction for the operating speed.

The switching on of the on-going transistor can be timed directly from the instant of switching off of the off-going transistor, for example by implementing a fixed time from instance of the other. However, the commutation switching timing of the on-going transistor can be calculated separately and independently from the commutation switching timing of the off-going transistor. The on-going transistor switching can also be made independently as a fixed delay or by using a voltage offset from the instant of the back emf zero crossing across two legs of the phase windings In additional embodiments, the switching off of the off-going transistor is controlled to switch at instances occurring after an on-period of less than 120 degrees. Likewise, in a further embodiment, the switching on of the on-going transistor is controlled to switch at instances occurring after an off-period of greater than 120 degrees.

In an additional embodiment, the switching method for six-step motor drives comprises a motor drive with an output inverter that provides commutation switching of power to the phase windings of a driven motor and is supplied by a variable bus that regulates the current to the output inverter and to the motor. The output inverter comprises a three phase H-bridge with six transistors and six associated freewheeling diodes, wherein the transistors are switched to commutate power to the phase windings by a pair of two transistors conducting during conduction steps and at each commutation step one off-going transistor is switched off and one on-going transistor is switched on. The switching method further comprises monitoring of the back emf on at least one leg of the phase windings of the motor, and using detection of instances of near zero back emf across two legs of the phase windings to control commutation, wherein timing of the switching of the off-going transistor is separated from the switching of the on-going transistor. Near zero back emf would mean having a value of less than 5% of the full operating back emf, or more preferably even less than 2 volts such as the freewheeling diode forward conduction voltage. It should be noted that instances occurring where differences of back emf across two legs crossing zero voltage may be detected directly by direct difference measurement of the back emfs, or may be done indirectly through monitoring variations of individual back emf voltages.

In general, it is most preferable to monitor the back emf on two legs of the phase windings in a wye configuration because the commutation event timing can be derived from the detection of back emf zero crossings of the difference of the voltages of the two legs, or when one voltage instantaneously exceeds to other. However, it is also possible to measure the back emf across a single leg to neutral, or a virtual neutral, to utilize for detection of zero crossings. This method is less preferable because a 30 degree phase shift delay must be added from the detection of a back emf zero crossing before the following triggered commutation event. That requires additional calculations and has inherent inaccuracies. Likewise, it is also most preferable to construct the motor drives to use switching in conventional 60 degree transistor pair conductions and with six-stepped commutation. However, it is also possible to utilize the switching method in accordance with the invention for use with other variations of stepped commutation, employing other than 60 degree conduction steps, but with added costs and complexity.

DESCRIPTION OF THE DRAWINGS

The invention and its many advantages and features will become better understood upon reading the following detailed description of the preferred embodiments in conjunction with the following drawings, wherein:

FIG. 11 are the six step switching tables for the output inverter of FIG. 5 with waveform plot of FIG. 6 showing the consequences of late and early simultaneous commutations not in accordance with the invention.

FIG. 13 is a plot of a motor drive output phase current waveform using inaccurate simultaneous commutation switching not in accordance with the invention.

DESCRIPTION OF THE PREFERRED EMBODIMENT

Figure 1:
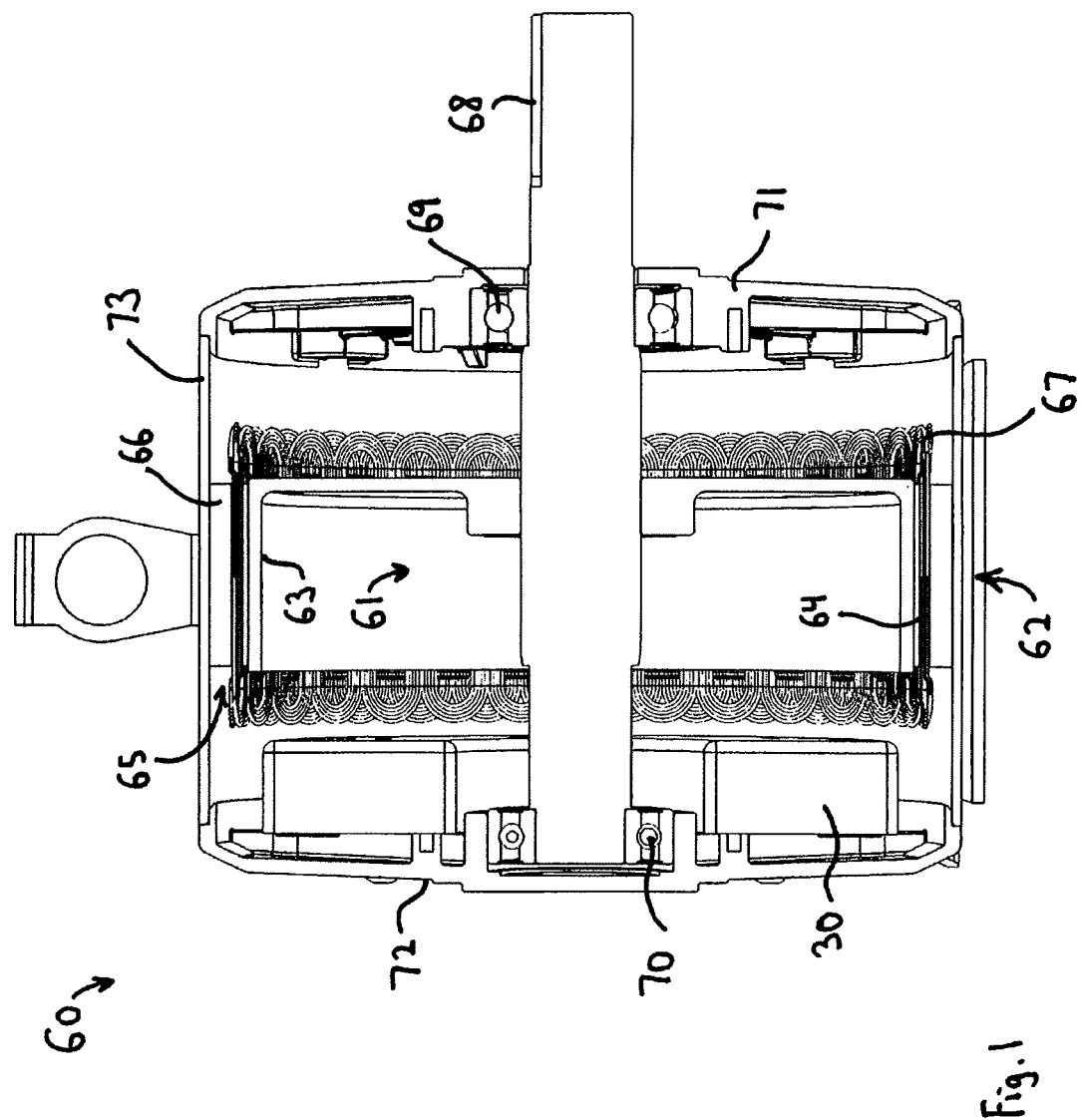
FIG. 1 is a side view of an air core motor with sinusoidal back emf for use with a motor drive in accordance with the invention.

Turning to the drawings, wherein like reference characters designate identical or corresponding parts, a side view of an air core motor with sinusoidal back emf for use with a motor drive capable of employing the switching method in accordance with the invention is shown in FIG. 1. The air core motor 60 is comprised of a rotor 61 and a stator 62. The rotor 61 has a rotor backiron 63 with an attached array of alternating polarity permanent magnets 64. The magnets 64 drive magnetic flux back and forth across a magnetic air gap 65 to a laminated stator backiron 66. Low loss Litz wire windings 67 are located directly within the magnetic airgap 65 and are bonded to the stator backiron 66. The rotor 61 is attached to a center shaft 68 that is journaled for rotation by bearings 69, 70. The bearings 69, 70 are supported by housing endplates 71, 72 that are connected by outer housing tube 73. The stator backiron 66 is supported by the outer housing tube 73. The windings 67 are energized by the motor drive 30 which may be contained inside the housing tube 73 or alternatively mounted on the outside of the housing end plate 72. As the rotor 61 is rotated, it creates multiple phase sinusoidal back emf in the windings 67. Although shown with a single rotor topology, air core motors for use with the motors drive in accordance with the invention can also be constructed with windings bonded to a non-ferromagnetic form that is supported between two rotating surfaces of the rotor.

Figure 2:
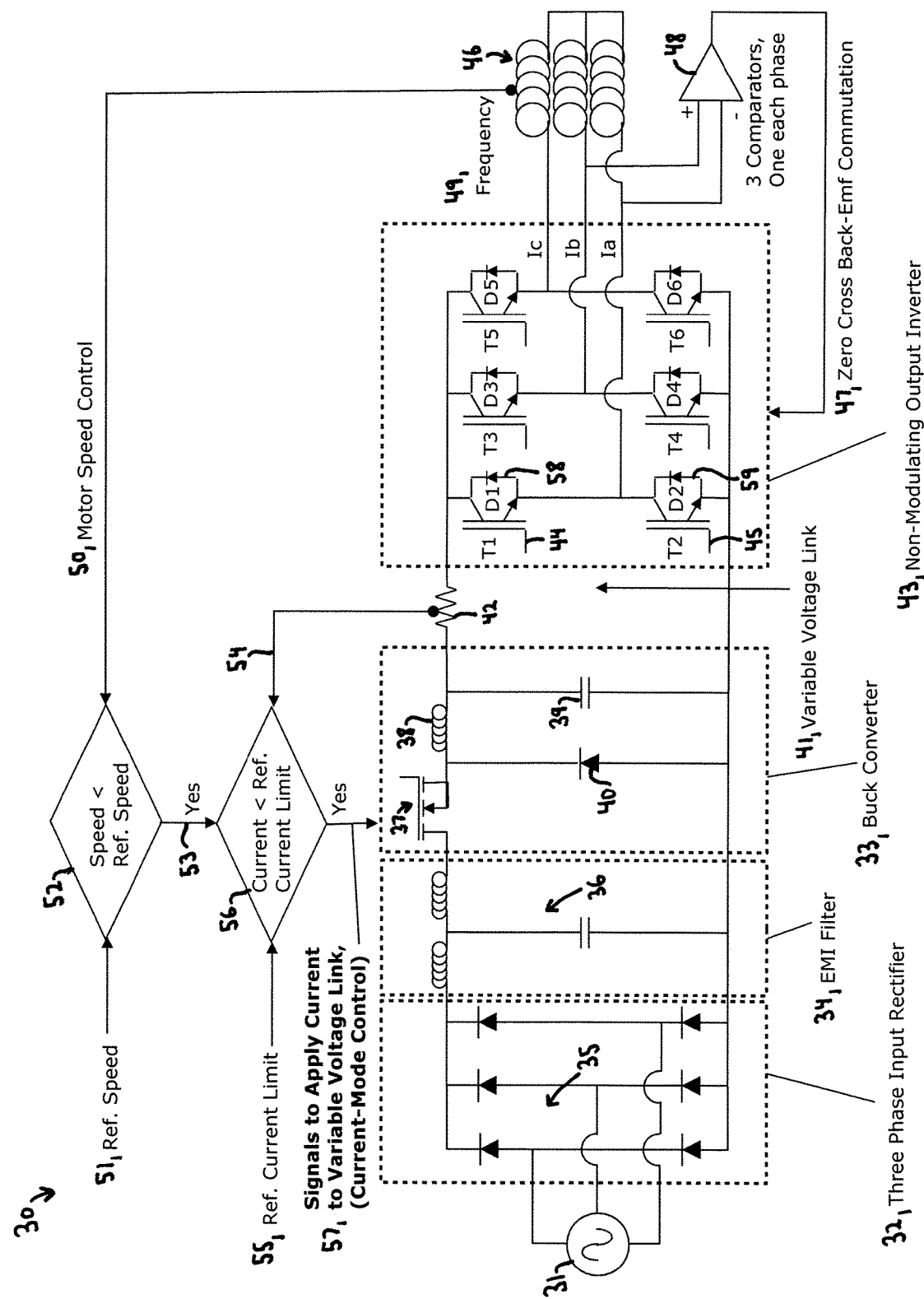
FIG. 2 is a schematic drawing of a motor drive in accordance with the invention.

A motor drive capable of employing the switching method in accordance with the invention is shown in FIG. 2. The motor drive 30 comprises a unique six-step version of commutation that is designed to be specially suited for air core motors with sinusoidal back emf and also with very low inductance and high pole count. The drive 30 receives fixed frequency AC supply power 31 into a three phase input rectifier 35 which is coupled to an EMI conduction filter 34 that powers a switchmode power converter 33 with DC power. The EMI filter 34 utilizes an L-C-L configuration 36 to prevent switching noise from the switchmode converter 33 from propagating back to AC utility supply power 31. For DC powered transportation applications such as electric aviation, the rectifier 32 need not be used and DC power can be supplied directly to the switchmode converter 33. As shown, the switchmode converter 33 comprises a buck converter using a MOSFET 37 providing current-mode control regulation to a variable voltage bus 41. The MOSFET 37 may be operated in continuous-current mode or alternately with reduced switching losses in discontinuous-current mode. Filter inductance 38, filter capacitance 39 and diode 40 complete the buck converter 33. The buck converter 33 supplies three phase synchronous power to a non-modulating output inverter 43 for driving the motor air core armature windings 34. The converter 33 provides regulated current to the variable bus 41 through current-mode control, and the voltage across the variable bus 41 varies as a result while maintaining the constant current. Unlike conventional sine wave drives, the motor drive 30 provides sinusoidal top shaped six-step voltage and rectangular shaped 6-step current to the armature windings 46. The motor drive 30 also does not energize all of the windings 46 at a single time like conventional sine wave drives. For a three phase motor, only two of the three phase windings 46 are energized at a time. This makes commutation control much easier and more reliable. In addition, it eliminates the generation of common mode currents that can damage motor bearings driven from conventional sine wave PWM drives. Also unlike conventional BLDC motor drives, the motor drive 30 does not put out a trapezoidal voltage to the windings 46. Instead, the drive with special regulation and sized/design filter, can match the sinusoidal top shape of the back emf, with output voltage, greatly reducing conduction torque ripple while also increasing efficiency.

A resistor 42 is provided in the variable bus 41 between the switchmode converter 33 and the non-modulating output inverter 43 to provide for current measurement. The non-modulating commutation-only output inverter 43 provides commutation switching and comprises six IGBT transistors 44, 45 with built-in freewheel diodes 58, 59 in a three phase H-bridge that are energized two at a time to commutate current to the armature windings 46. The transistors 44, 45 in the output inverter 43 are each switched fully-on and fully-off in operation of the drive. Control for the commutation of the output inverter 43 is provided by zero cross monitoring 47 of the back emf each of the armature windings 46 as the rotor rotates. Commutation switching may be advanced after measuring near zero crossing voltage across two phase winding legs 46 and sending through op amps or comparators 48. Alternatively, separate back-emf signals can be conditioned and sent into a micro-controller (not shown) for application of the commutation logic there instead, which may be easier and have advantages. Torque control for the motor/armature current control 54 is provided through the buck converter 33 and switching of the MOSFET 37. Motor speed control 50 is provided using frequency feedback 49 in an outer loop 50 from the armature windings 46 and through turning on/off 47 the output from the converter 33 and current flow to the variable voltage bus 41. Other configurations of switchmode converters 33 for providing current-mode control may also be utilized such as more than a single transistor switching and additional components to yield higher efficiency conversion.

Figure 3:
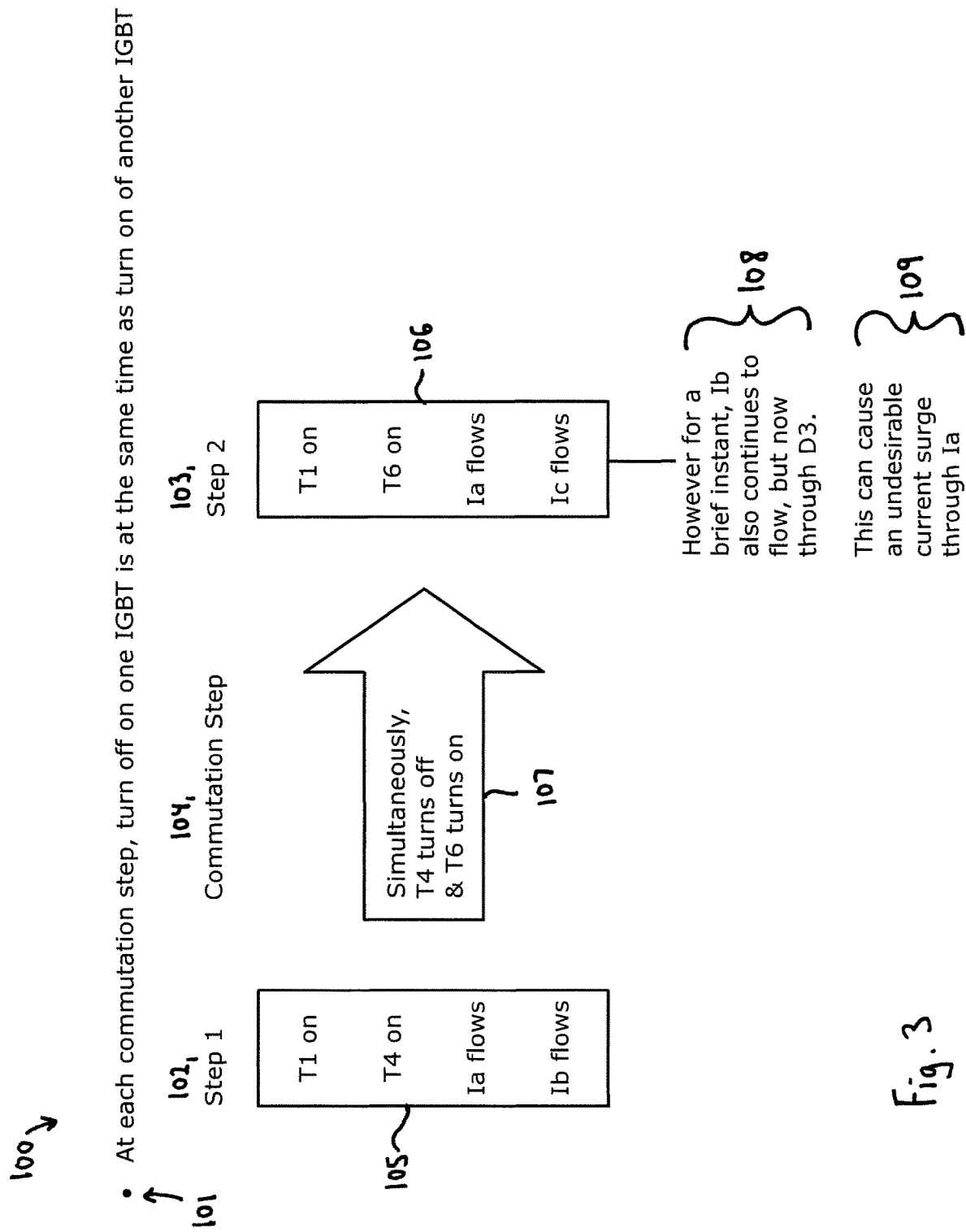
FIG. 3 is switching method for use with the motor drive of FIG. 2, but not in accordance with the invention.

A switching method for use with the motor drive of FIG. 2, but not in accordance with the invention is shown in FIG. 3. The method 100 consists of the process 101 whereby at each commutation step, turn off of one IGBT in the output inverter is at the same time as the turn on of another IGBT. Using the identified components of the motor drive of FIG. 2, (Conduction Step 1) 102 commutates to (Conduction Step 2) 103 through (Commutation Step) 104. The Conduction Step 1 conditions 105 consist of T1 on, T4 on, and currents Ia and In flowing. The Conduction Step 2 conditions 106 consist of T1 on, T6 on, and currents Ia and Ic flowing. The Commutation Step 104 consists of the process 107 of simultaneously turning T4 off and turning T6 on. This switching method 100 is not in accordance with the invention. One consequence 108 is that for a brief instant, Ib also continues to flow but now through D3. A deficiency 109 that results is that this can cause an undesirable current surge Ia, as much as up to twice normal value.

Figure 4:
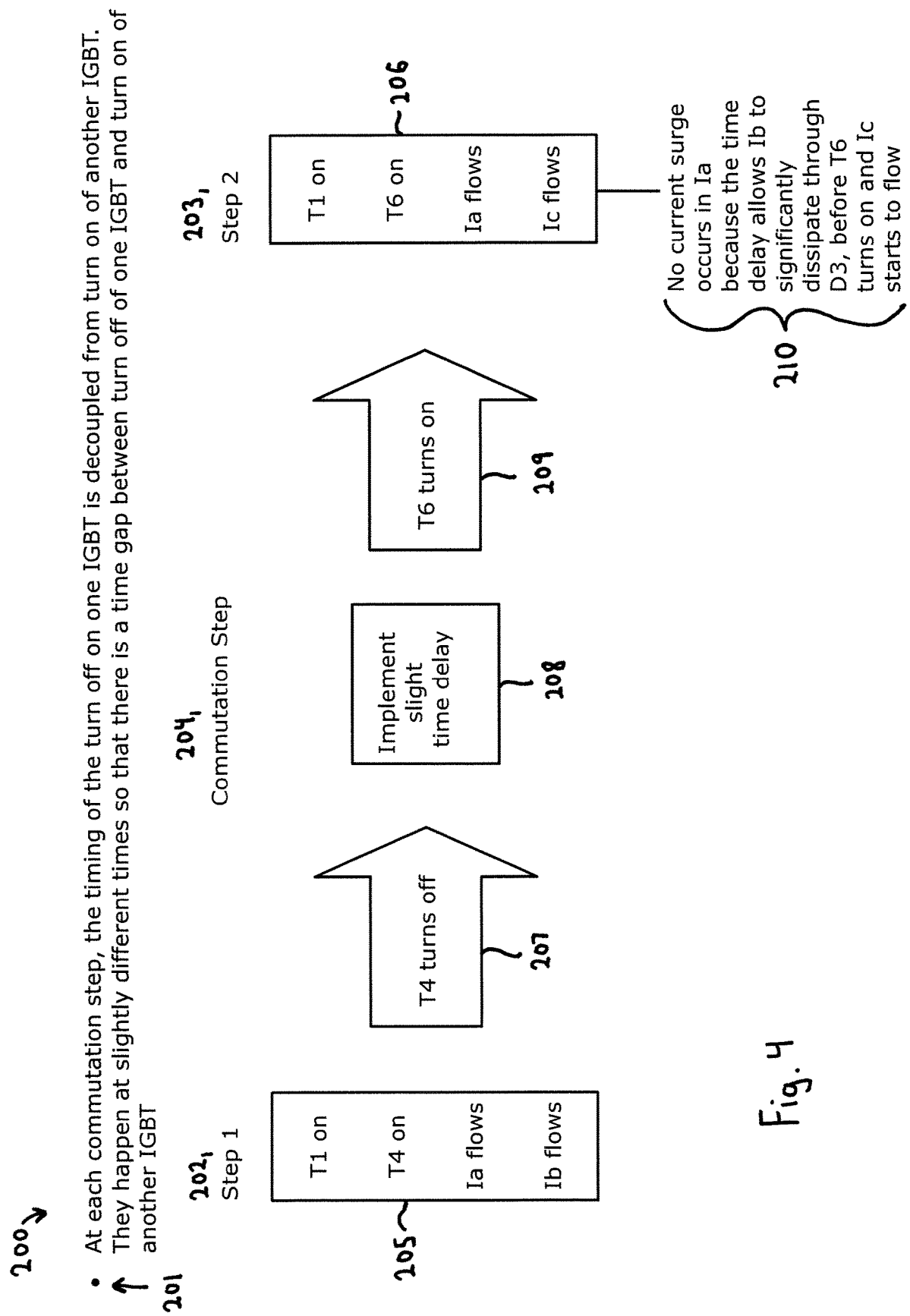
FIG. 4 is switching method for use with the motor drive of FIG. 2, in accordance with the invention.

A switching method for use with the motor drive of FIG. 2, in accordance with the invention is shown in FIG. 4. The method 200 consists of the process 201 whereby at each commutation step, the timing of the turn off on one IGBT is decoupled from the turn on of another IGBT. They happen at slightly different times so that there is a time gap between turn off of one IGBT and turn on of another IGBT. Using the identified components of the motor drive of FIG. 2, (Conduction Step 1) 202 commutates to (Conduction Step 2) 203 through (Commutation Step) 204. The Conduction Step 1 conditions 205 consist of T1 on, T4 on, and currents Ia and Ib flowing. The Conduction Step 2 conditions 206 consist of T1 on, T6 on, and currents Ia and Ic flowing. The Commutation Step 204 consists of the process 207, 208, 209. First T4 turns off 207, then a slight time delay is implemented 208 and later T6 turns on 209. The benefit 210 is that no current surge, or a greatly reduced current surge, occurs in Ia because the time delay allows Ib to significantly dissipate through D3, before T6 turns on an Ic starts to flow. During the time delay 208, only one IGBT is on and as a result no current flows from the positive to ground of the variable voltage bus 41. The buck converter operating as a current source will then immediately charge the capacitor 39 to the voltage value of the output of the three phase rectifier 32. As a result the voltage on the variable voltage bus 41 increase rapidly at commutation steps. Although this would seem to be undesirable to those of ordinary skill in the art, we have found that could sometimes be beneficial. A higher full voltage on the variable voltage bus 41 can allow a maximum current increase rate to the armature windings 46 when T6 is turned on.

However in other cases, the charging of the capacitor 39 to a higher voltage during the time delay 208, can itself cause an undesirable phase current spike, if too long and too high voltage when the next IGBT is turned on. Accordingly, in another embodiment of the invention, the motor drive 30 is controlled to reduce the duty cycle of the buck converter 33 through MOSFET 37, during the time delay period 208. Therefore, the capacitor 39 does not charge to a significantly higher voltage during the period when only one IGBT 44, 45 in the output inverter 43 is turned on and not drawing power from the variable voltage bus 41. As a result, no phase current spike will result when the next IGBT is turned on such as T6.

Not only is the switching method able to reduce current surges resulting from added freewheeling diode conduction with instantaneous currents in all three phase windings, it is also effective at preventing the generation of back emf shorting current spikes when the motor drive is driving low inductance motors. It further alleviates the need for exceptionally precise commutation switching timing for driving such motors, which may include air core or slotless types.

Figure 5:
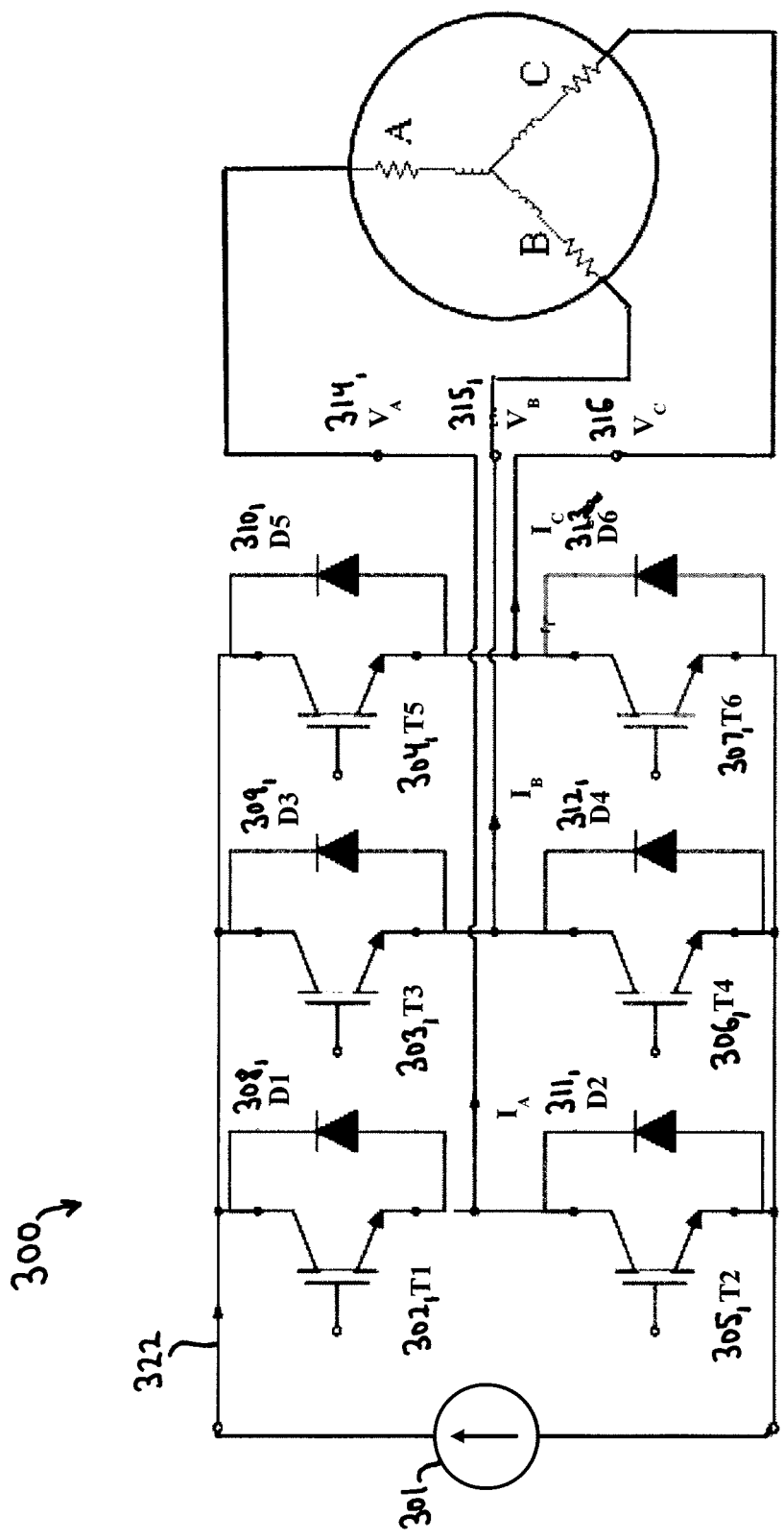
FIG. 5 is a schematic drawing of an output inverter of a motor drive in accordance with the invention.

A schematic drawing of an output inverter of a motor drive in accordance with the invention is shown in FIG. 5. The output inverter 300 is powered by a current source 301 through variable bus 322. Although a voltage source could alternatively be utilized, a current source with fast response rate is preferable for the ability to rapidly track changes in the motor back emf and load. The output inverter 300 comprises a three phase H-bridge with six transistors 302-307 and six associated freewheeling diodes 308-313. A pair from one of the upper transistors 308, 309, 310 along with one of the lower transistors 305, 306, 307 are energized for approximately 60° steps during conduction of power to the phase windings 314, 315, 316 of the motor.

Figure 6:
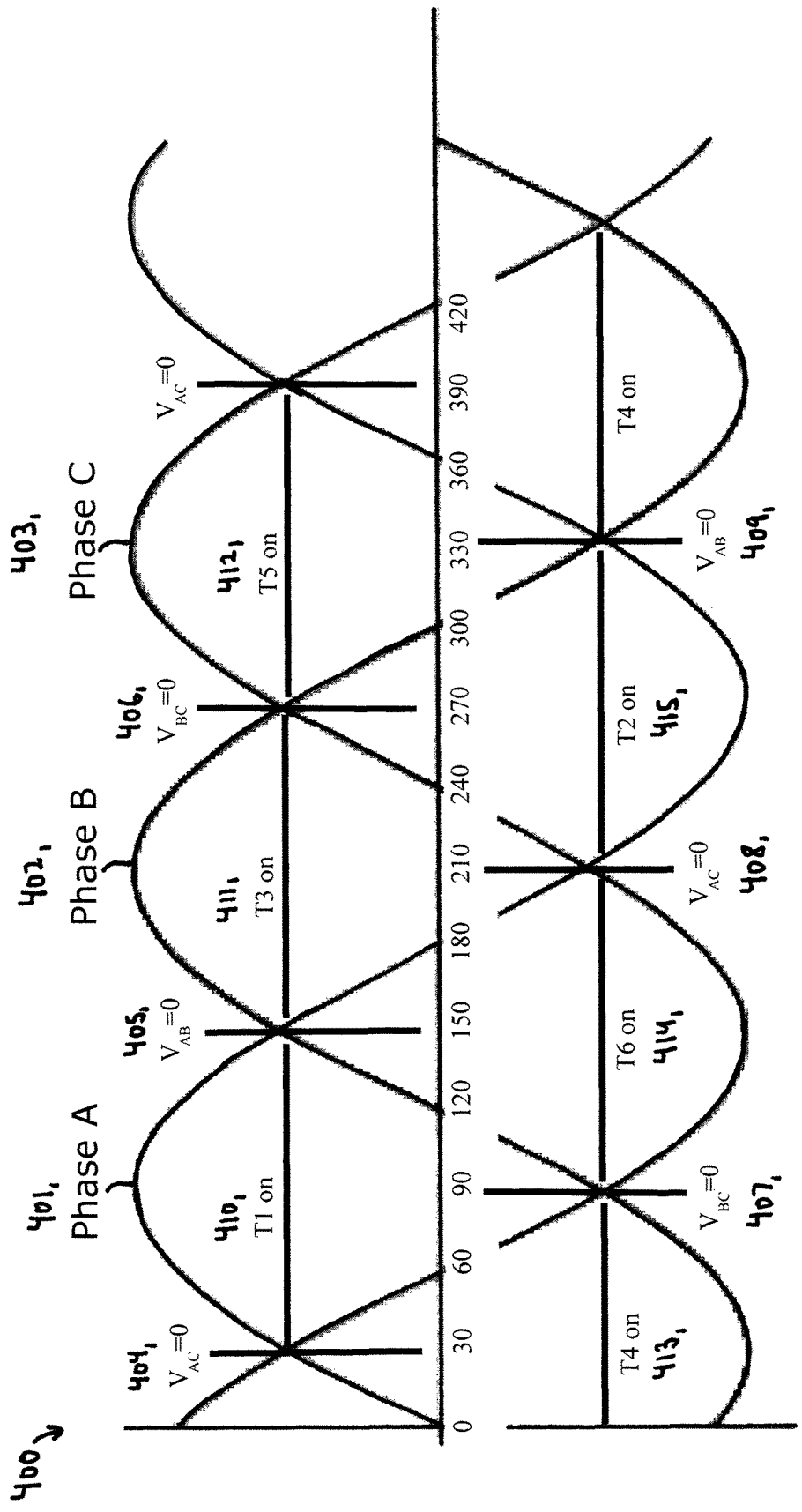
FIG. 6 is a waveform plot showing the output phase back emf sine waves, zero crossings and transistors on for the output inverter of FIG. 5 in accordance with the invention.

A waveform plot showing the output phase back emf sine waves, zero crossings and transistors on for the output inverter of FIG. 5 in accordance with the invention is shown in FIG. 6. The waveform plot 400 comprises the back emfs 401, 402, 403 which are shown as sine waves although motors with trapezoidal back emf could also be driven by the motor drive with switching in accordance with the invention. Phase A 401 is set as crossing zero voltage at 0° degrees. At 30°, the back emfs of Phase A 401—Phase C, or $V_{AC}$ 404 is equal to zero volts. At 150°, $V_{AB}$ 405 is equal to zero volts. At 270°, $V_{BC}$ 406 is equal to zero volts. The period of (T1 on) 410 is between zero crossings 404, 405. The period of (T3 on) 411 is between zero crossings 405, 406. The period of (T5 on) 412 is between zero crossings 406, 404. Likewise, the switching is similar yet offset for the bottom transistors 305, 306, 307. At 90°, $V_{BC}$ 407 is equal to zero volts. At 210°, $V_{AC}$ 408 is equal to zero volts. At 330°, $V_{AB}$ 409 is equal to zero volts. The period of (T4 on) 413 is between zero crossings 409, 407. The period of (T6 on) 414 is between zero crossings 407, 408. The period of (T2 on) 415 is between zero crossings 408, 409.

Figure 7:
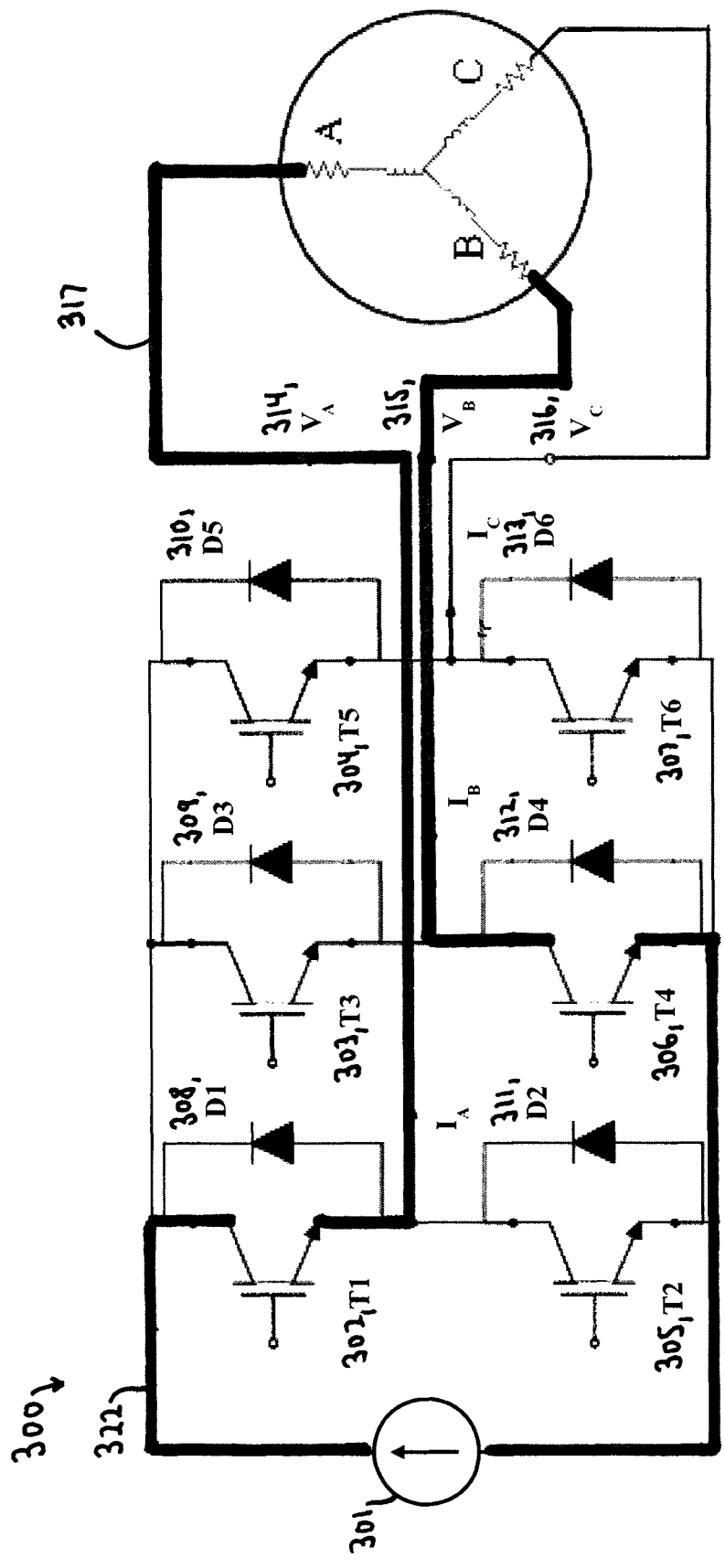
FIG. 7 is the output inverter of FIG. 5 showing the desirable current source current flow before commutation and before 90° in accordance with the invention.

The output inverter of FIG. 5 showing the desirable current source current flow before commutation and before 90° in accordance with the invention is shown in FIG. 7. During this conduction step of the output inverter 300, the current source 301 drives regulated current in the loop 317. The output inverter 300 is supplied by the current source 301 through variable bus 322. The loop 317 goes through on (transistor T1) 302, through (phase winding A) 314, (phase winding B) 315, and through on (transistor T4) 306.

Figure 8:
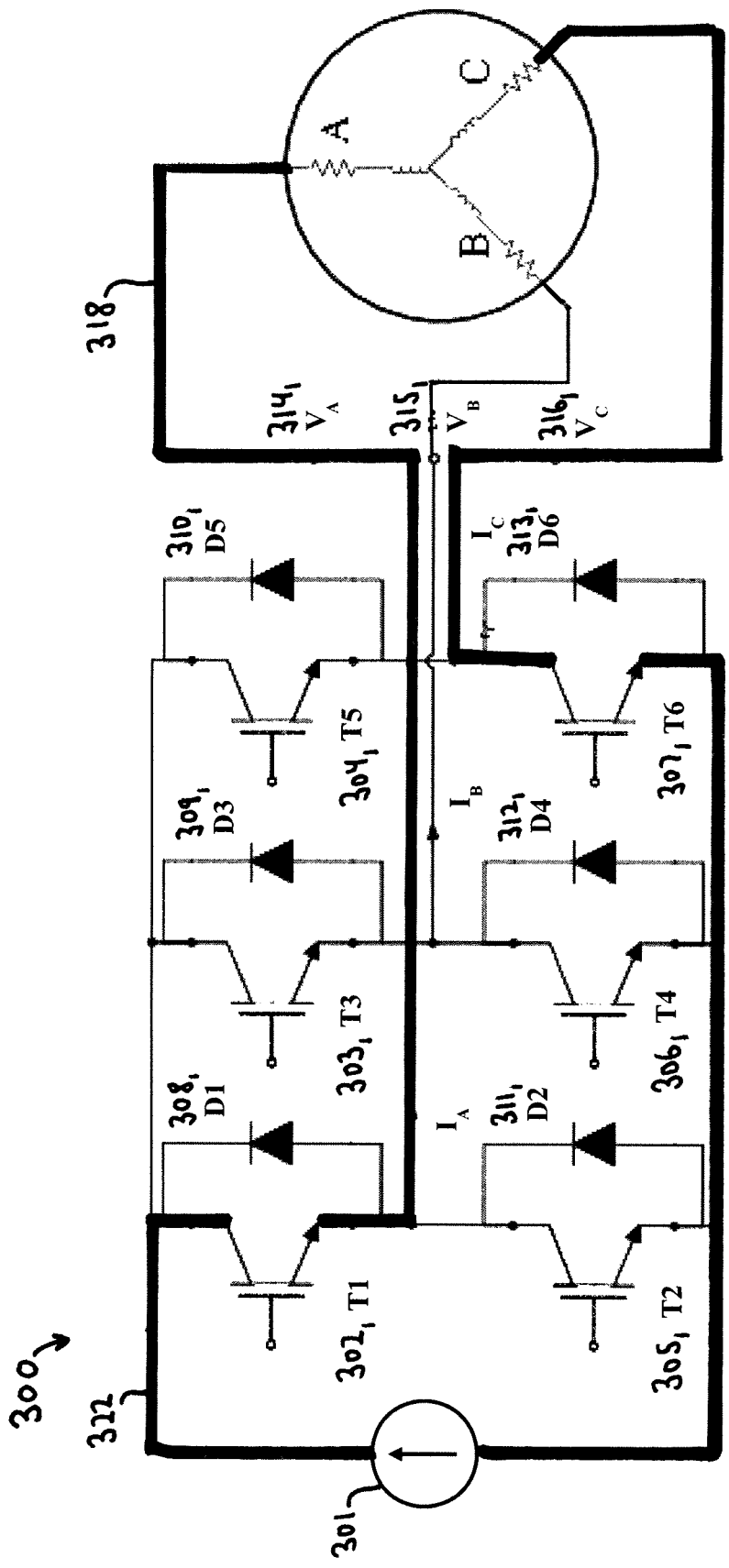
FIG. 8 is the output inverter of FIG. 5 showing the desirable current source current flow after commutation and after 90° in accordance with the invention.

The output inverter of FIG. 5 showing the desirable current source current flow after commutation and after 90° in accordance with the invention is shown in FIG. 8. The current source 301 drives regulated current in the loop 318. The output inverter 300 is supplied by the current source 301 through variable bus 322. The loop 318 goes through on (transistor T1) 302, through (phase winding A) 314, (phase winding B) 316, and through on (transistor T6) 307.

Figure 9:
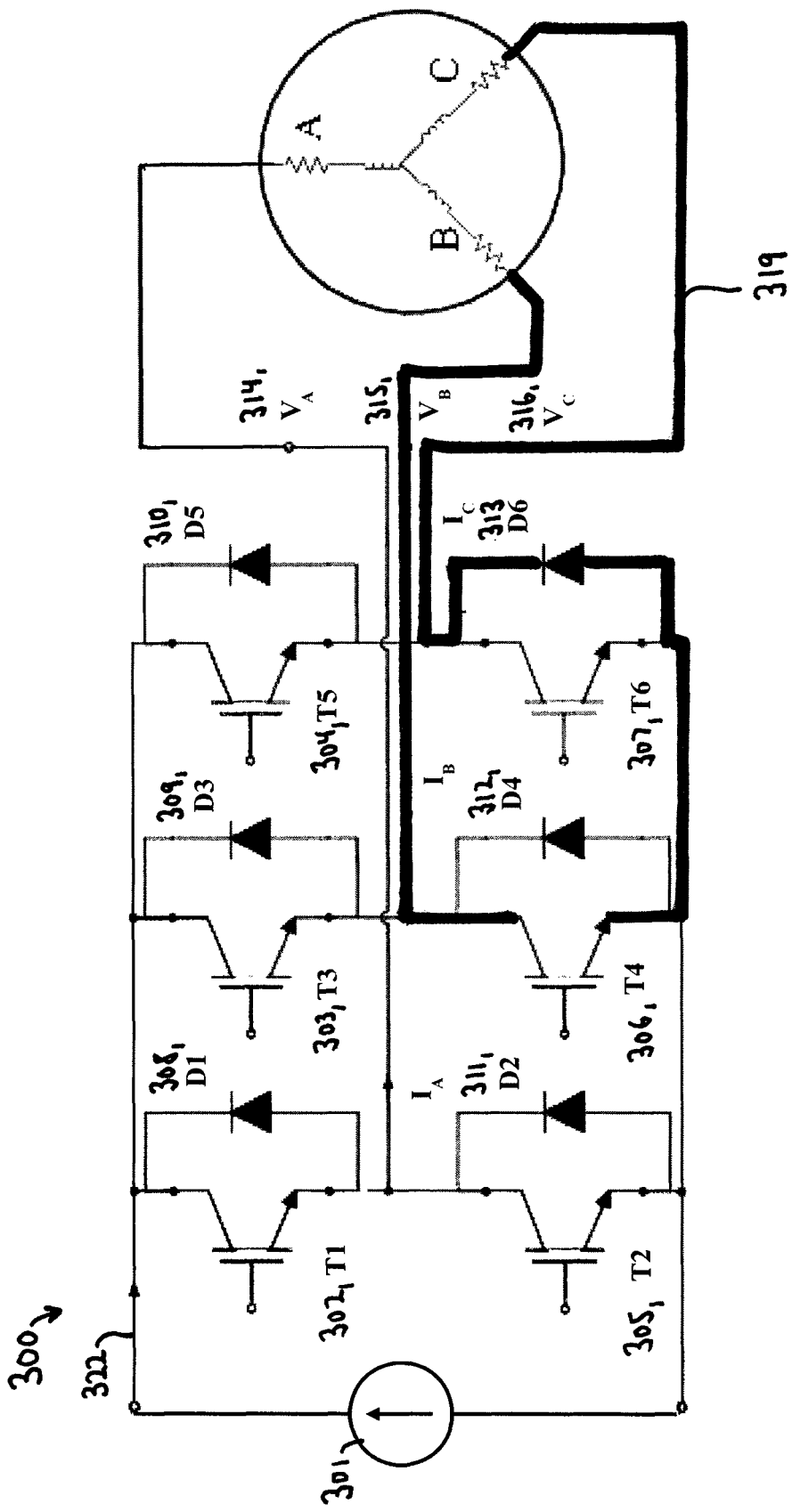
FIG. 9 is the output inverter of FIG. 5 showing the undesirable back emf shorting current flow before simultaneous commutation occurring after 90° not in accordance with the invention.
Figure 10:
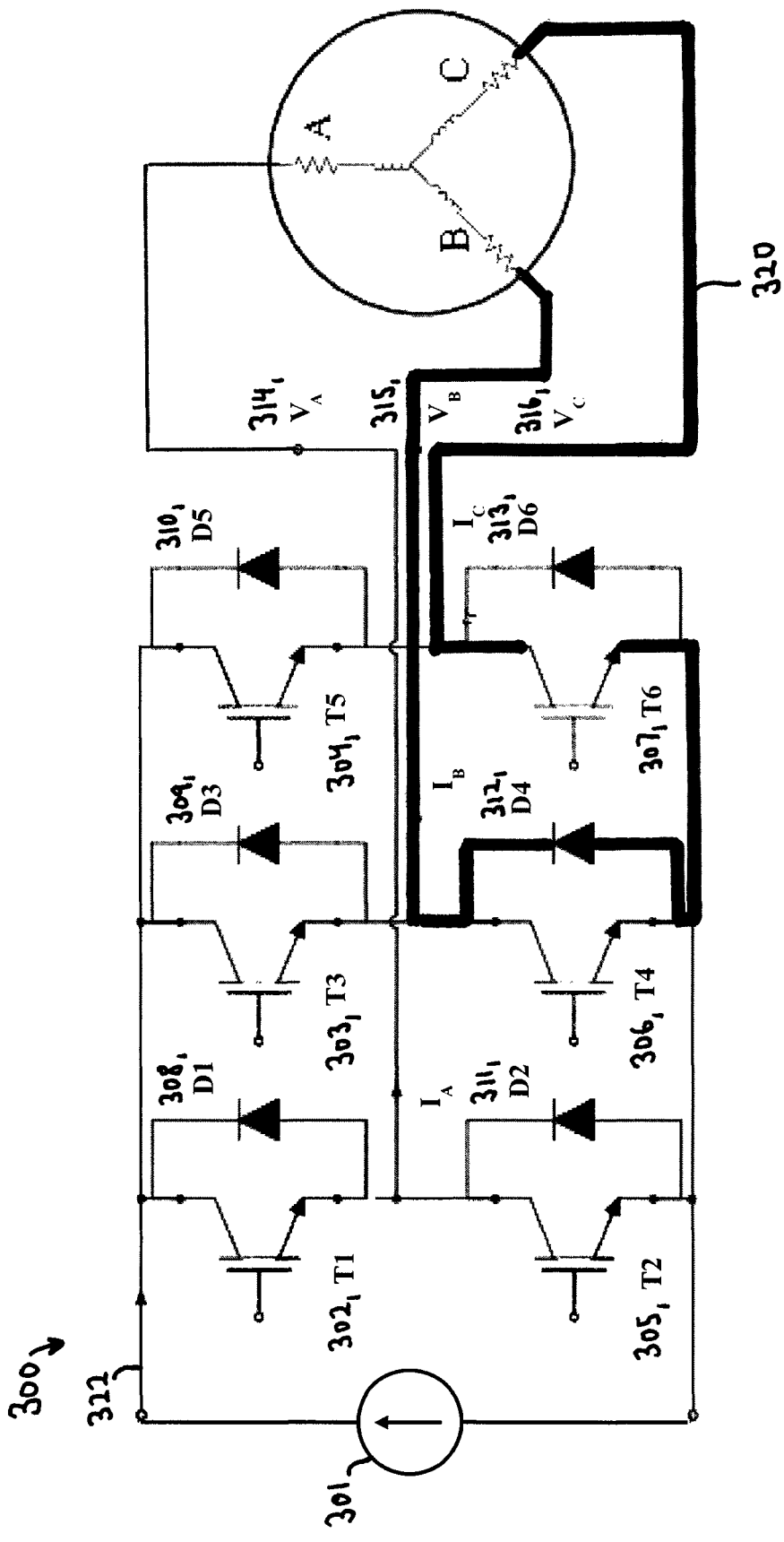
FIG. 10 is the output inverter of FIG. 5 showing the undesirable back emf shorting current flow after simultaneous commutation occurring before 90° not in accordance with the invention.

During commutation, particularly when driving motors with low windings inductance such as air core motors, imprecise commutation switching timing (not at the zero back emf instant) can give rise to large undesirable current spikes from unintended instantaneous shorting of phase back emf. The output inverter of FIG. 5 showing the undesirable back emf shorting current flow before conventional simultaneous commutation occurring after 90° not in accordance with the invention is shown in FIG. 9. As shown, the simultaneous commutation switching of the off-going transistor and switching of the on-going transistor is late and occurring slightly after the target 90°. Undesirable current loop 319 results wherein the back emf across phase legs B and C has crossed zero volts and is now positive. As a result, the undesirable current loop 319 shorts the back emf across (phase winding B) 315 and (phase winding C) 316 through (transistor T4) 306 which is still on and through (freewheeling diode D6) 313 which is now forward biased. The resulting shorting causes a current spike that reduces the motor and drive efficiency.

During commutation, inaccurate commutation switching timing due to early switching can also give rise to significant undesirable current spikes from unintended instantaneous shorting of phase back emf. The output inverter of FIG. 5 showing the undesirable back emf shorting current flow after simultaneous commutation occurring after 90° not in accordance with the invention is shown in FIG. 9. As shown, the simultaneous commutation switching of the off-going transistor and switching of the on-going transistor is late and occurring slightly after the target 90°. Undesirable current loop 320 results wherein the back emf across phase legs B and C has not yet reached zero volts and is negative. As a result, the undesirable current loop 320 shorts the back emf across (phase winding B) 315 and (phase winding C) 316 through (transistor T6) 307 which is now on and through (freewheeling diode D4) 312 which is forward biased. The resulting shorting causes a current spike that reduces the motor and drive efficiency.

The six step switching tables for the output inverter of FIG. 5 and waveform plot of FIG. 6 showing the consequences of late and early simultaneous commutations not in accordance with the invention are shown in FIG. 11. The switching table for late commutation 500 shows the conduction intervals 501, (Transistors on) 502, polarities of the phase winding back emfs 503 at the end of the conduction intervals and the consequences of late switching 504. The switching table for early commutation 600 shows the conduction intervals 601, (Transistors on) 602, polarities of the phase winding back emfs 603 at the end of the conduction intervals and the consequences of early switching 604. As can be seen and is well known in the art, accurate commutation switching at the zero back emf instances is required to prevent generation undesirable phase back emf shorting and current spikes. These current spikes can be particularly large for motor drives powering motors with low windings inductance, because the generated current can increase very rapidly.

Unfortunately, achieving the high accuracy for commutation switching timing desired for use with very low inductance motors such as air core or slotless motors can be difficult to achieve. We have surprisingly found however that required high accuracy requirements can be reduced by employing switching in accordance with the invention. Accordingly, the turn off of the off-going transistor is switched to occur at a time prior to the back emf reaching zero, and the turn on of the on-going transistor is switched to occur at a time after the back emf zero crossing. The non-simultaneous switching completely eliminates the back emf shorting and resulting undesirable current spikes without requiring precise highly accurate timing and with extremely low inductance air core motors as well as conventional inductance slot wound motors. In other embodiments, the switching of the off-going transistor and switching of the on-going transistor may be separated from each other or triggered without direct relation to each other.

Figure 12:
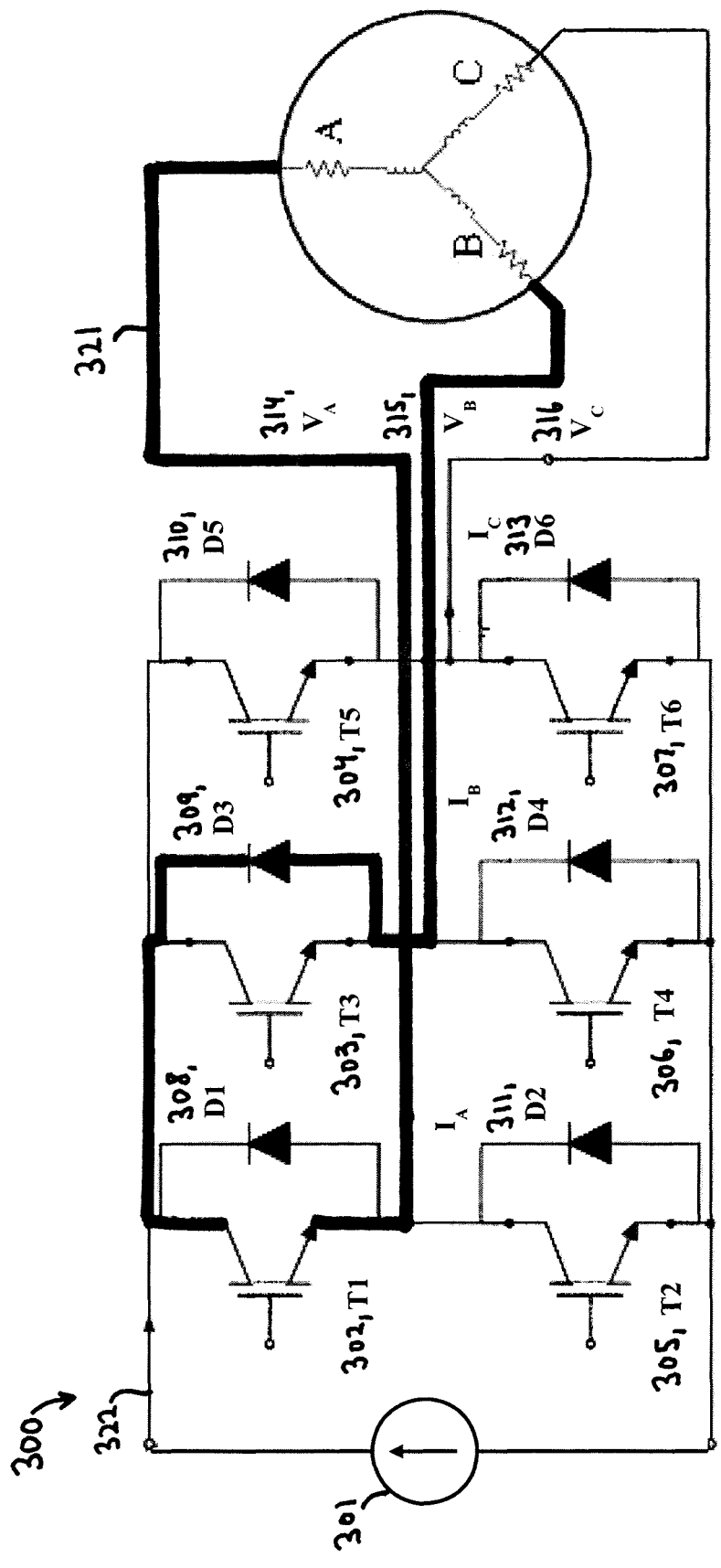
FIG. 12 is the output inverter of FIG. 5 showing the desirable freewheeling diode transistor protection current flow from non-simultaneous commutation in accordance with the invention.

The output inverter of FIG. 5 showing the desirable freewheeling diode transistor protection current flow from non-simultaneous commutation in accordance with the invention is shown in FIG. 12. During non-simultaneous commutation switching with the off-going transistor just switched off before back emf zero voltage at 90°, the previous conduction current through the phase windings 314, 315 continues to flow in the same direction briefly due to the stored magnetic energy in the windings. The desirable freewheeling diode transistor protection current flows in loop 321 which includes (phase winding A) 314, (phase winding B) 315, (transistor T1) 302 which is still on and through (freewheeling diode D3) 309. The (freewheeling diode D3) 309 prevents high voltage generation and damage to (transistor T3) 303.

A key benefit of the switching method in accordance with the invention is the reduction of current spikes and generated current pulses during commutation of the output inverter that would otherwise occur if employing coupled or connected switching of the off-going transistor with switching of the on going transistor. A plot of a motor drive output phase current waveform from using inaccurate simultaneous commutation switching of a low inductance motor, not in accordance with the invention, is shown in FIG. 13. The phase current waveform 400 comprises an on-period 401 of approximately 120 degrees and an off-period of 60 degrees between commutations. The on-period has an average current amplitude 404 which would ideally be as flat as possible. In the middle of the on-period, one of the other phase windings is switched off and another is simultaneously switched on. The period between each commutation event 403 is 60 degrees. With current conduction occurring instantaneously in all three phase windings due to freewheeling diode conduction, or due to inaccurate simultaneous commutation of a low inductance motor causing freewheeling diode shorting, current surges and spikes 405 are generated. The generated current spikes and pulses 405 reduce the motor and drive efficiency as well as cause undesirable torque pulsations and noise. The current spikes 405 being larger at the end of the conduction period 401 are indicative of delayed or late commutation switching occurring after instances of zero crossing of the voltage across two winding phase legs. When the delayed commutation switching is severely delayed, large reverse spikes 406 and 407 can be generated prior to turn on of the switching period 401, due to freewheel diode conduction shorting of the windings back emf. These large reverse spikes before turn on 406, 407 are preferably prevented from occurring. Use of the switching method in accordance with the invention has been found to be effective to preclude the generation of significant current pulses and spikes 405, 406, 407.

Obviously, numerous modifications and variations of the described preferred embodiment are possible and will occur to those skilled in the art in light of this disclosure of the invention.

Accordingly, I intend that these modifications and variations, and the equivalents thereof, be included within the spirit and scope of the invention as defined in the following claims, wherein I claim:

1. A switching method for six-step motor drives comprising:
   a motor drive with an output inverter that provides commutation switching of power to the phase windings of a driven motor and is supplied by a variable bus that regulates the current to said output inverter and to said motor;
   said output inverter comprises a three phase H-bridge with six transistors and six associated freewheeling diodes, wherein said transistors are switched to commutate power to said phase windings by a pair of two transistors conducting during approximately 60 degree conduction steps and at each commutation step, one off-going transistor is switched off and one on-going transistor is switched on;
   said switching method further comprising monitoring of the back emf on two legs of said phase windings of said motor, and commutating said output inverter by non-simultaneous switching of said off-going transistor which is connected to one of said two legs being monitored, and switching of said on-going transistor, wherein said off-going transistor is switched off before differences of said back emf across said two legs reaches zero voltage and said on-going transistor is switched on after differences of said back emf across said two legs crosses zero voltage.

2. A switching method for six-step motor drives as described in claim 1 wherein:
   the voltage across said variable bus varies as regulated current is supplied to said output inverter.

3. A switching method for six-step motor drives as described in claim 1 wherein:
   said switching off of said off-going transistor is controlled to switch at instances occurring when said differences of said back emf across said two legs has an absolute value of voltage that is greater than zero.

4. A switching method for six-step motor drives as described in claim 3 wherein:
   said absolute value of voltage that controls said switching of said off-going transistor is adjusted and varies as a portion of the present operating back emf.

5. A switching method for six-step motor drives as described in claim 1 wherein:
   said switching off of said off-going transistor is controlled to switch at instances occurring after an on-period of less than 120 degrees.

6. A switching method for six-step motor drives as described in claim 1 wherein:
   said switching reduces at least one of generated current spikes and generated current pulses, during commutation of said output inverter that would otherwise occur if employing simultaneous switching of said off-going transistor and switching of said on-going transistor.

7. A switching method for six-step motor drives as described in claim 1 wherein:
   said driven motor comprises an air core motor with low windings inductance and said back emf being sinusoidal.

8. A switching method for six-step motor drives comprising:
   a motor drive with an output inverter that provides commutation switching of power to the phase windings of a driven motor and is supplied by a variable bus that regulates the current to said output inverter and to said motor;
   said output inverter comprises an H-bridge with three phases, six transistors and six associated freewheeling diodes, wherein said transistors are switched to commutate power to said phase windings by a pair of two transistors conducting during conduction steps, and at each commutation step one off-going transistor is switched off and one on-going transistor is switched on;
   said switching method further comprising monitoring of the back emf on two legs of said phase windings of said motor for determining commutation timing, and commutating said output inverter through non-simultaneous switching of said off-going transistor with switching of said on-going transistor.

9. A switching method for six-step motor drives as described in claim 8 wherein:
   the voltage across said variable bus varies as regulated current is supplied to said output inverter.

10. A switching method for six-step motor drives as described in claim 8 wherein:
    said switching off of said off-going transistor is controlled to switch at instances occurring after an on-period of less than 120 degrees.

11. A switching method for six-step motor drives as described in claim 8 wherein:
    said switching on of said on-going transistor is controlled to switch at instances occurring after an off-period of greater than 120 degrees.

12. A switching method for six-step motor drives as described in claim 8 wherein:
    said driven motor comprises an air core motor with low windings inductance and said back emf being sinusoidal.

13. A switching method for six-step motor drives as described in claim 8 wherein:
    said switching reduces at least one of generated current spikes and generated current pulses, during commutation of said output inverter that would otherwise occur if employing simultaneous switching of said off-going transistor with switching of said on-going transistor.

14. A switching method for six-step motor drives as described in claim 8 wherein:
    said on-going transistor is switched on after time delay from said switching off of said off-switching transistor.

15. A switching method for six-step motor drives comprising:
    a motor drive with an output inverter that provides commutation switching of power to the phase windings of a driven motor and is supplied by a variable bus that regulates the current to said output inverter and to said motor;

said output inverter comprises a three phase H-bridge with six transistors and six associated freewheeling diodes, wherein said transistors are switched to commutate power to said phase windings by a pair of two transistors conducting during conduction steps and at each commutation step one off-going transistor is switched off and one on-going transistor is switched on;

said switching method further comprising monitoring of the back emf on at least one leg of said phase windings of said motor, and using detection of instances of near zero back emf across two legs of said phase windings to control commutation, wherein timing of said switching of said off-going transistor is separated from said switching of said on-going transistor.

16. A switching method for six-step motor drives as described in claim 15 wherein:

the voltage across said variable bus varies as regulated current is supplied to said output inverter.

17. A switching method for six-step motor drives as described in claim 15 wherein:

said driven motor comprises an air core motor having low windings inductance and sinusoidal back emf.

18. A switching method for six-step motor drives as described in claim 15 wherein:

said switching on of said on-going transistor is controlled to happen separately from said switching off of said off-going transistor.

19. A switching method for six-step motor drives as described in claim 15 wherein:

said switching off of said off-going transistor is controlled to switch at instances occurring after an on-period of less than 120 degrees.

20. A switching method for six-step motor drives as described in claim 15 wherein:

said switching reduces at least one of generated current spikes and generated current pulses, during commutation of said output inverter that would otherwise occur if employing coupled switching of said off-going transistor and switching of said on-going transistor.

* * * * *